Patented Nov. 21, 1939

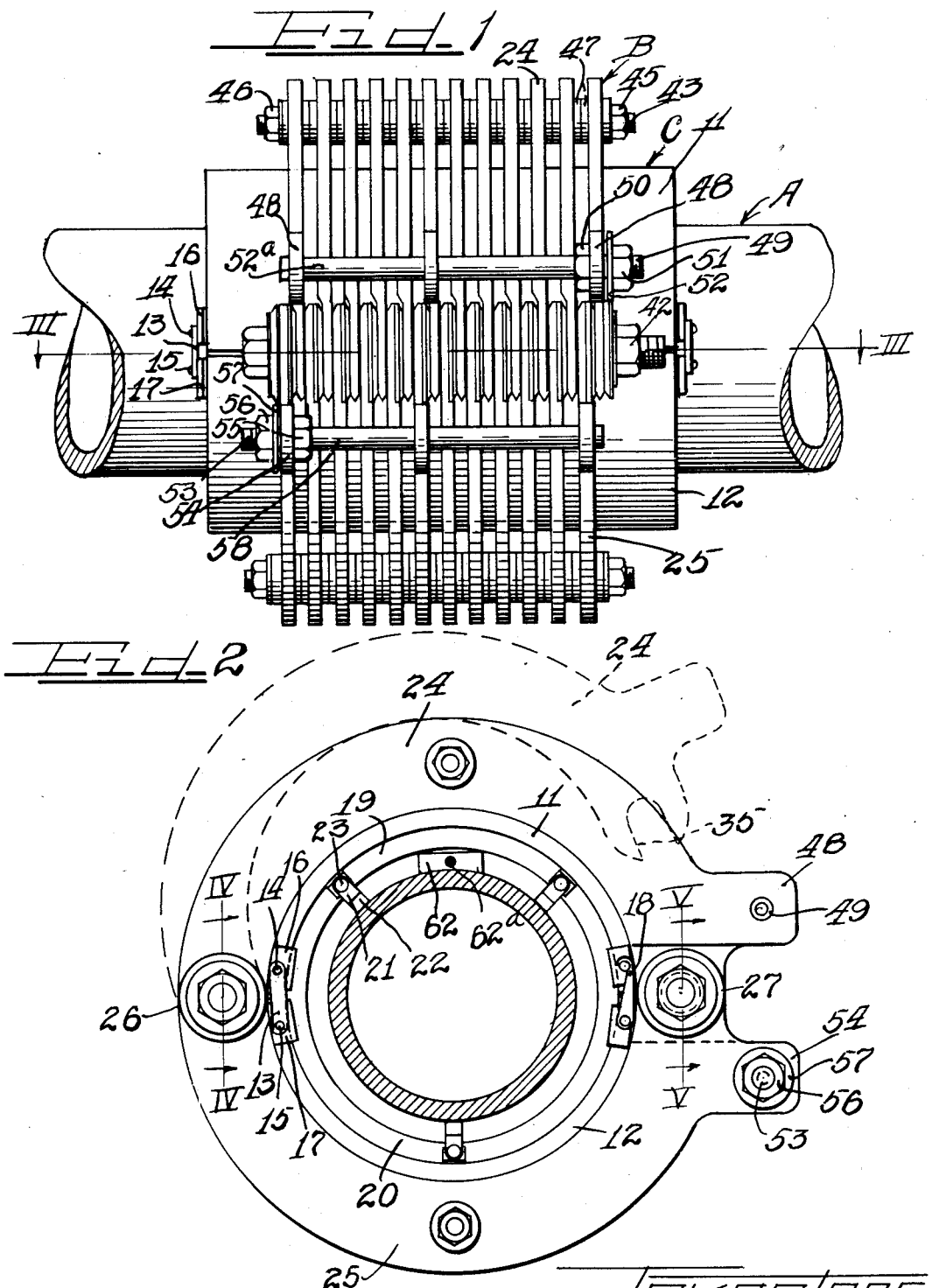

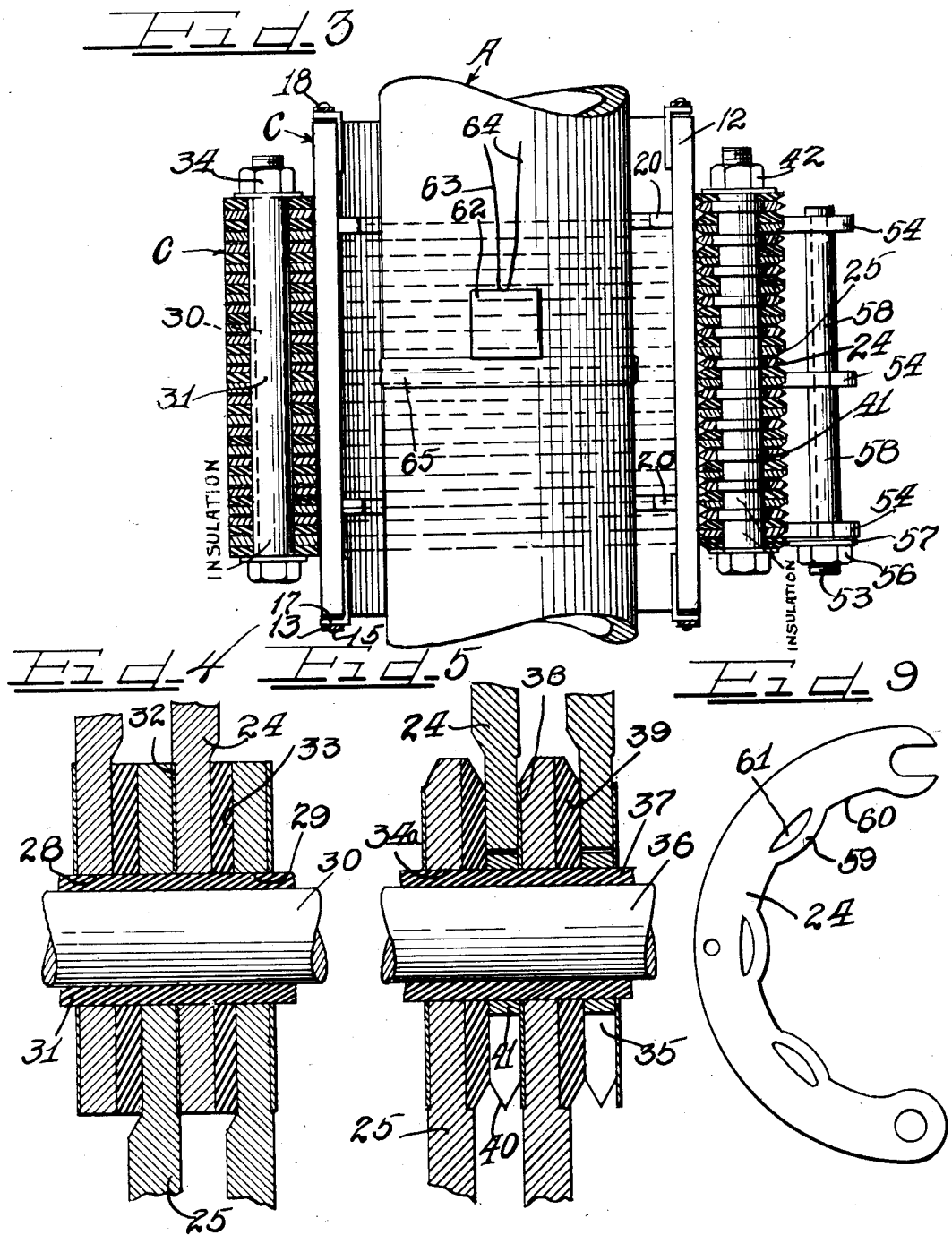

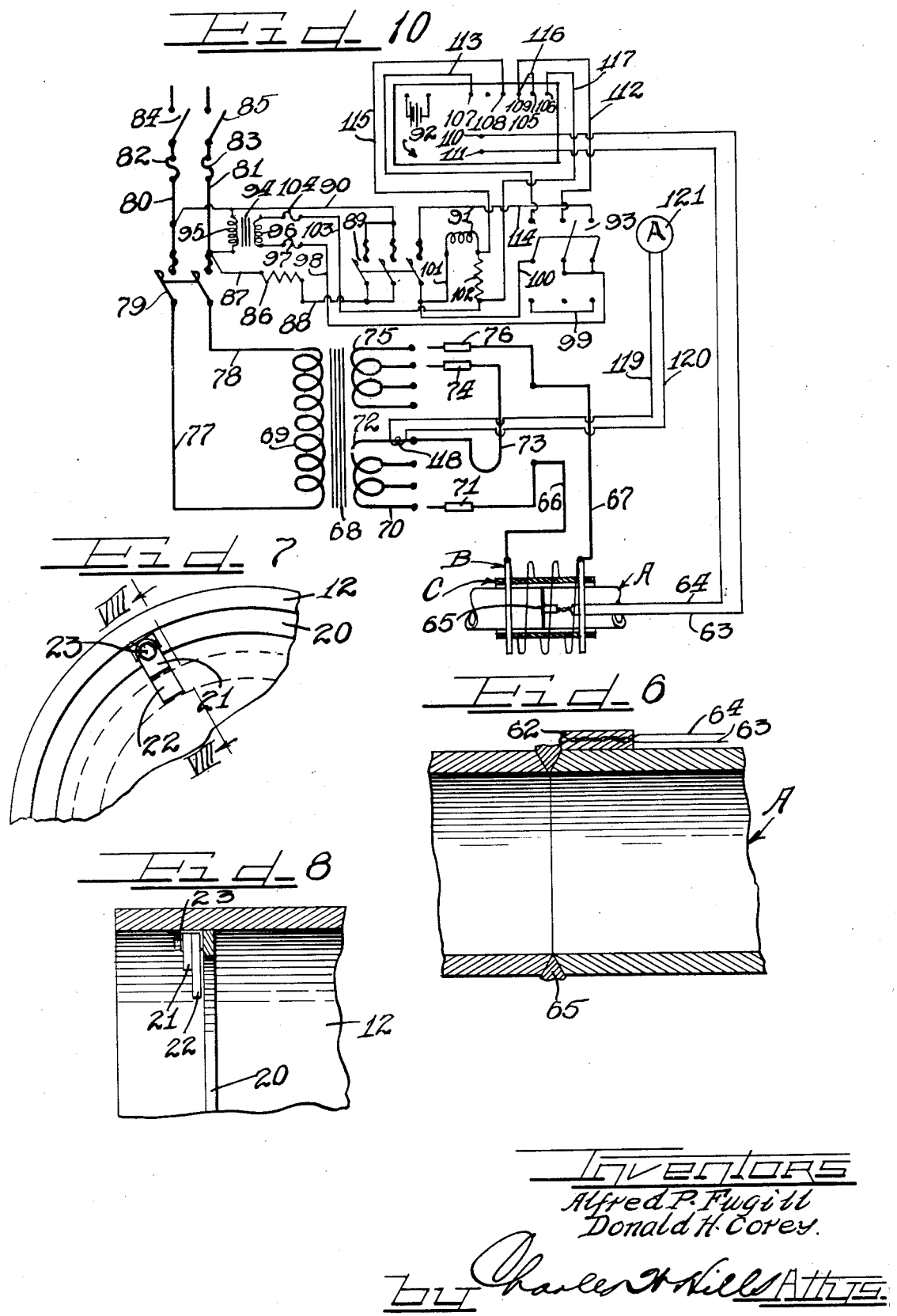

2,180,513

UNITED STATES PATENT OFFICE 2,180,513

APPARATUS FOR RELIEVING STRESSES IN WELDS

Alfred P. Fugill, Ferndale, and Donald H. Corey, Grosse Pointe, Mich., assignors, by mesne assignments, to Kuhlman Electric Company, Bay City, Mich., a corporation of Michigan Application July 27, 1936, Serial No. 92,786

1 Claim. (Cl. 219—13)

The present invention is in general concerned with an improved means whereby a method may be practiced for relieving stresses occurring in welded joints and the like. More particularly, it is concerned with improved electrical apparatus and control therefor, whereby the welded joint of a pipe may be uniformly heated to a predetermined temperature, maintained within close limits at that temperature for a period of time, and then slowly cooled, all in accordance with our improved method.

In the past, difficulties have been experienced in the use of welded pipe joints due to the lack of a suitable method or apparatus whereby the stresses set up in the joint during the welding operation could be efficaciously relieved. As a consequence, either no effort was made to relieve these stresses or attempts were made to relieve the stresses by heating with an oil or gas-fired equipment.

In the first case, these stresses resulted in a very poor joint, which, especially in the case of high-pressure piping, presented a constant source of danger and trouble.

The use of oil or gas-fired equipment did little to remedy the situation. This equipment was very inconvenient to use as it was necessary to build a furnace around the pipe and pipe the gas or oil thereto. Moreover, even after the most careful preparations, the results attainable therewith were decidedly doubtful. It was very difficult, if not impossible, to apply heat uniformly to the joint, and the heating could not be controlled in such a manner as to assure that the joint stresses would be relieved. Also, due to the inherent characteristics of such equipment, there was an abrupt drop in temperature between the portion of the pipe within the furnace and the portions of the pipe outside the furnace, with the result that, even though there might be some relief of the stresses in the weld itself, this sudden change of temperature in the adjacent portions of the pipe would tend to set up other stresses at these points.

Realizing the foregoing difficulties as experienced in connection with the use of oil and gas-fired equipment, the present invention contemplates improved means for the application of heat to the weld, and means whereby this heat may be controlled so as to increase and decrease the temperature of the metal in the joint and adjacent pipe portions in such a manner as to positively assure the relieving of the stresses therein and not set up additional stresses in other parts of the pipe in so doing.

To this end, the present invention proposes to provide a split winding for inductively heating the weld, which may be clamped over the joint in which the stresses are to be relieved. This winding is insulated from the pipe and is provided with terminals which facilitate its being connected to a suitable transformer and auxiliary control. The transformer and control equipment may, if desired, be mounted as a unit on a small truck, thus enabling it to be easily transferred from one location to another.

The transformer contains a plurality of winding taps by means of which the transformer may be connected so as to supply increased or decreased amounts of current to the split winding or heating coil.

The control of the heating to maintain a desired temperature within very close limits is accomplished by means of a potentiometer actuated by a thermocouple attached to the weld, this potentiometer being interconnected with suitable switches for energizing and deenergizing the transformer in response to the changes in the weld temperature.

It is a further object of the present invention to provide improved apparatus for heating a welded joint to relieve the stresses therein, and which will allow the residual stresses set up by the welding operation to relieve themselves by plastic flow or creep, and to change the martensitic and troostitic spots to sorbite, whereby the ductility and toughness of the joint will be increased.

A further object is to provide improved apparatus, whereby a joint may be inductively heated to remove stresses therein.

It is also an object to provide novel means for connecting a thermocouple to the pipe joint being treated.

Another object is to provide apparatus whereby the pipe joint may be uniformly heated to a predetermined temperature.

Still another object is to provide apparatus of the herein described type which may be utilized in our improved method of relieving stresses in a welded pipe joint.

Other objects and features of the invention will more fully appear from the following detailed description taken in connection with the accompanying drawings which illustrate the preferred embodiment thereof, and in which:

Figure 1 is a fragmentary elevational view showing the heating coil of the herein described invention applied to a pipe joint in which the stresses set up by welding are to be relieved;

Figure 2 is an end view of the same;

Figure 3 is a longitudinal sectional view showing the cooperative relationship of the various parts of the heating coil and means for supporting this coil on the pipe, taken substantially on line III—III of Figure 1;

Figure 4 is an enlarged fragmentary sectional view through the pivotal connection of the sections composing the heating coil, taken substantially on line IV—IV of Figure 2;

Figure 5 is a similar sectional view through the detachably secured ends of the sections of the heating coil, taken substantially on line V—V of Figure 2;

Figure 6 is an enlarged fragmentary sectional view taken through the welded joint of the pipe, showing the manner in which the twisted ends of the thermocouple are secured to the weld;

Figure 7 is an enlarged fragmentary view showing the details of means for adjustably supporting the heating coil shield on different sized pipes;

Figure 8 is a sectional view of the same taken substantially on line VIII—VIII of Figure 7;

Figure 9 is a detail view showing an alternative construction of one of the coil sections; and Figure 10 is a view schematically showing the electrical circuits and connections of the various elements embodied in the herein described invention.

As shown on the drawings:

Referring to Figure 1, there is shown a pipe which is generally indicated at A, this pipe having a welded joint in which the welding stresses are to be relieved. Symmetrically disposed around the joint portion of the pipe, is a multiturn coil, generally indicated at B, which is adapted when energized to set up a magnetic field having a path through the pipe metal. This field in passing through the pipe will create eddy currents which will cause heating of the pipe. In order to protect the heating coil from the high temperatures developed in the pipe, a sleeve of heat insulating material, generally indicated at C, is disposed around the pipe joint between the pipe and the heating coil. In addition to protecting the heating coil from the heat in the pipe, this sleeve also serves as an electrical insulating medium which prevents short-circuiting the turns of the heating coil, which would result if the coil were placed in direct contact with the pipe.

Although the insulating sleeve C may be constructed of any suitable material, it has been found that a composition composed of concrete and asbestos serves this purpose admirably. The sleeve comprises in this case a pair of semicylindrical sections 11 and 12, which will form a cylindrical sleeve when the edges of the sections are disposed in abutting relation. One set of edges is hingedly connected by hinge links 13 which in each case is pivoted at its ends on pivot screws 14 and 15 respectively. These screws are threaded into metal end plates 16 and 17 which are secured to the sleeve sections. The other set of abutting edges of the sleeve are secured in a similar manner, except that the links in this case are open at one end to form a hook as shown at 18 in Figure 2.

As shown in Figure 3, adjacent each end of the sleeve, there is provided on the interior of the sleeve arcuate ring sections 19 and 20 which cooperate to form a circular spacer for supporting the sleeve symmetrically upon a pipe of large size.

In order to facilitate the use of the insulating sleeve on pipes of sizes less than that which would be engaged by the spacer rings, adjustable supports are provided as shown in Figures 2, 7 and 8. These supports are uniformly spaced circumferentially of the spacer ring and comprise a plurality of pivoted lugs 21 and 22, of different lengths, these lugs having their corresponding ends pivotally supported on the spacer sections as by a pivot bolt 23. These lugs are adapted to be selectively extended or folded back so as to lie along the side of the spacer sections. With this arrangement, it will be evident that by properly selecting these lugs, the sleeve may be supported on different sizes of pipe, without the necessity of having to use a different sleeve for each size of pipe.

The heating coil for inductively heating the pipe joint is composed of a metallic conductor in the form of a bar which is disposed edgewise relative to the pipe. This coil has its respective turns composed of, in this instance, a pair of arcuate sections 24 and 25, as shown in Figure 2. One set of ends of the sections of each turn is integrally connected as generally shown at 26 and the other ends are arranged for detachably connecting as generally shown at 27. The ends of each turn, when the coil is in operative position around the pipe, are connected with the adjacent turns of the coil so that a continuous conductor is formed, but which may be opened up, as shown in Figure 2, by rotating the sections 24 relative to the sections 25.

The hinged ends of the coil sections are apertured as shown at 28 and 29 in Figure 4 for receiving a common pivot member 30 which is surrounded by a sleeve of insulating material 31. This sleeve prevents the pivot member from short-circuiting the coil turns. The sections 24 and 25 which cooperate to form a single turn of the coil, have their ends at the hinged joint in surface contact, a metallic wear plate 32 being secured to the end of one of the sections and being disposed between the cooperatively associated ends of the two sections forming the coil turns. The sections of each turn are insulatingly spaced from the sections of the adjacent turns by means of insulating washers 33, and one end of the pivot member 30 is threaded to receive a nut 34 by means of which the hinged ends of the sections may be clamped into tight engagement when the coil is in operative position on the pipe.

The other ends of the coil sections which are arranged for being detachably connected are adapted for interleaf connection. These ends of the sections 25 are apertured as shown at 34a, and the associated ends of the sections 24 are provided with an open slot as shown in dotted lines at 35 in Figure 2. As in the case of the hinge joint, a member 36 extends through the aligned apertures 34a of the ends of sections 25, and is surrounded by an insulating sleeve 37. The end of each section 25 which is arranged to make surface engagement with one of the ends of a section 24 is provided with a contact surface plate 38. The sections of the respective turns are likewise insulatingly spaced by means of spacing washers 39.

These ends of the sections 24 are beveled as shown at 40 so as to permit movement of these ends into closed position, wherein they are in contact with the proper ends of sections 25. In order to maintain the insulated washers 39 which are disposed between corresponding ends of sections 25 at proper distance apart for receiving therebetween the ends of sections 24, there is provided in each case a metallic ring-like spacer 41 which is adapted to enter the slotted end of a section 24, when this end is moved into contact position with a section 25. As in the case of the hinge joint, the member 36 is also provided with a threaded end for receiving a nut 42 by means of which the detachably associated ends of the coil turns may be clamped in contact relationship.

In order that the sections 25 and sections 24 comprising the coil may be more firmly held in spaced relation, the sections 24 are provided substantially at their mid-portions with a thru bolt 43 which extends thru the respective sections and is provided with end nuts 45 and 46. Surrounding the bolt 43 and disposed between each of the sections 24 are pairs of insulating washers 47 so that when the nuts 45 and 46 are tightened, the sections 24 and insulating washers will be in tight engagement and properly spaced.

A similar arrangement is provided for holding the sections 25 in spaced relation.

In order to facilitate opening and closing of the coil sections, handles are provided adjacent the detachably connectable ends of the coil sections. For this purpose, the end sections 24 and an intermediate section 24 are provided with outwardly projecting lug portions as shown at 48, these lugs being apertured to receive therein a metal rod 49. One end of this rod is provided with a nut 50 for engaging the inner surface of one of the lugs 48, preferably the lug on one of the extreme end sections, and a nut 51 for engaging the exterior surface of this lug. Associated with the nut 51 is a washer 52 so that the nut 51 and washer 52 may be utilized to secure an electrical conductor to this end of the coil. The rod 49, where it passes through the other lugs 48, is insulatingly supported by a sleeve 52a of appropriate insulating material such as horn fiber.

A similar handle is provided in connection with sections 25 by means of a rod 53 which is supported in lugs 54. At the opposite end of the coil from the one to which the electrical connection previously described is to be made, the rod 53 is provided with nuts 55 and 56 and washer 57 by which electrical connection may be made to the opposite end of the heating coil. The rod 53 is insulatingly supported in the other lugs 54 by a sleeve 58 of insulating material such as horn fiber.

It will be noted that, when the heating coil is in operative position surrounding the pipe joint, the inner edges of the sections composing the heating coil are in surface engagement with the insulating sleeve C. In order to more effectively prevent the sections composing the coil from becoming heated from the radiated heat from the pipe joint, the inner edges of the respective sections may be constructed as shown in Figure 9. In this case, portions of the inner edge are deflected as shown at 59 in order to define inwardly disposed edge portions and openings 61 which will permit circulation of air transversely of the coil turns along the inner edges of the sections, thereby keeping the coil sections cool.

Heretofore in connecting the twisted ends of a thermocouple to a weld in a pipe joint, it has been customary to drill the weld for this purpose. Naturally, such a procedure might have a weakening effect upon the weld. In view of this danger, the thermocouple in this invention is connected by providing a small block of metallic material as shown at 62, this block being laid on the pipe surface adjacent the weld and tacked at one end as by welding. The block 62 contains a longitudinally extending opening 62a into which the twisted ends of the thermocouple wires 63 and 64 may be inserted. The connection is then completed by the application of force to the exterior surface of the block as by hitting the block with a hammer or the like. This causes a distortion of the opening in the block and results in securing the twisted ends against removal from the block.

Referring to Figure 10, the control for the heating coil will now be described.

The insulating sleeve is first mounted on the pipe having a weld 65 therein, and around this sleeve the heating coil is properly disposed. The ends of the heating coil are connected to a transformer through conductors 66 and 67.

This transformer as diagrammatically shown at 68 comprises a primary 69 and a secondary 70. The secondary of the transformer is composed of sections having taps in order that various voltages may be secured and so that by means of suitable plugs which may be connected with the desired taps, the current through the heating coil may be varied as desired.

As shown, conductor 66 is connected to a plug 71 which may be connected to one end of a secondary section 72 having its other end connected thru a conductor 73 to a plug 74 which may be connected to one end of secondary section 75 or to one of the taps thereon. The other end of the section 75 or one of the taps of the section may be connected to a plug 76 which is electrically in circuit with conductor 67. With the tap connections to the secondary, it will be apparent that, for example, section 75 may be connected in buck or boost relation to the section 72 and the amount of such buck or boost may be varied by a proper selection of taps. Although this transformer may be of any desired size and construction, in practice it has been found that a 75 KVA. transformer having a primary voltage rating of 440 and a secondary voltage rating of 72—24—3.5 works out very well.

The primary side of the transformer is connected through conductors 77 and 78 to one side of a double pole contactor 79 and thence through conductors 80 and 81, fuses 82 and 83 to disconnecting switches 84 and 85 which are arranged for connection to a suitable source of power. In this case the power source would be 440 volts and at a commercial frequency of 60 cycles.

The main contactor 79 for energizing and de-energizing the transformer is operated by an actuating coil 86 having one end connected by a conductor 87 to conductor 81 forming one side of the incoming supply. The other side of the operating coil is connected through a conductor 88 to two poles of a three-pole contactor 89, which are connected in parallel, and thence to conductor 90 and back to main line 80 which is the other side of the supply.

Contactor 89 is provided with an operating coil 91 which may be connected for manual control or automatic operation by means of a potentiometer 92, by a three-pole double throw switch 93. Throwing the switch 93 into engagement with its lowermost contacts, the operating coil 91 of contactor 89 will be energized from a control transformer 94 having its primary 95 connected to conductors 80 and 81, through the following circuit: From one end of the secondary 96 of transformer 94 through fuse 97, conductor 98, to two of the movable blades of switch 93, from one of these blades through conductor 99 to the third blade of the switch, through conductor 100, conductor 101 to one end of the operating coil, thence through a resistor 102, conductor 103, fuse 104 and thence to the other side of the secondary winding 96 of the control transformer.

It will therefore be evident that with the control switch 93 in its downward position, the main transformer 68 would supply current to the heating coil and continue to heat up the pipe joint to a temperature of substantially 1400° F. at which temperature the pipe material becomes substantially non-magnetic. In other words this temperature is the maximum temperature which may be secured. However, it is undesirable to heat the pipe to this maximum temperature and the pipe is ordinarily heated to a temperature of approximately 1100° F. or 1200° F. In the practice of the herein described method, the pipe temperature should then be maintained substantially constant for a period depending upon the thickness of the pipe metal, this period being equivalent to approximately one hour per inch of thickness of the pipe metal.

At this point it is desirable to transfer the control to a potentiometer which will function to energize and deenergize the heating coil in a manner to maintain the temperature substantially constant.

For automatic control, the switch 93 is then actuated so that its movable blades are connected to the uppermost contacts as shown in Figure 10. Under these conditions, the control is transferred to the potentiometer 92.

This potentiometer is of well known construction, and for this reason it is not deemed necessary to discuss its mechanism in detail. It is thought that it will be sufficient to state that its mechanism includes a motor which is connected to contacts 105 and 106, a common contact which is connected to terminal 107 and is adapted to be selectively connected to contacts which are connected to terminals 108 and 109. Operation of the potentiometer is controlled by the thermocouple which is connected through conductors 63 and 64 to terminals 110 and 111.

With the switch blades of switch 93 in their upward position, let it be presumed that the temperature of the joint has been decreased and it is desired to pass current through the heating coil to raise the temperature. Under these circumstances, contacts of the potentiometer which are connected to terminals 107 and 109 will be interconnected and the operating coil 91 of contactor 89 will be energized through the following circuit: From one side of the secondary 96 of transformer 94 through fuse 97, conductor 98, through the central switch blade of switch 93, conductor 112 to terminal 109, thence to terminal 107, conductor 113, through the left switch blade of switch 93 to conductor 100, conductor 101, the operating coil 91, thence through resistor 102, conductor 103, fuse 104 and back to the other side of the secondary 96 of transformer 94. The operating coil 91 being energized will close the contacts of switch 89 and interlock the switch in closed position through the following circuit: From the secondary 96 of transformer 94 through fuse 97, conductor 98, through the right hand switch blade of switch 93, conductor 114 to one of the contacts of switch 89, thence through conductor 101 to operating coil 91, resistor 102, conductor 103, fuse 104, and thence back to the other end of secondary 96 of transformer 94.

Closing of contactor 89 will energize the operating coil 86 of the main contactor thru the following circuit: From conductor 81, through conductor 87 to one side of operating coil 86, thence through conductor 88, through the two left contacts of contactor 89, to conductor 90 and thence back to conductor 80, which is the other side of the supply circuit. Energization of operating coil 86 will cause contactor 79 to close and thus energize transformer 68 to send current through the heating coil B.

The temperature of the joint will therefore continue to rise until the limiting temperature as determined by the setting of the potentiometer is reached. When this temperature is reached, the contact connected to terminal 107 of the potentiometer will be moved into engagement with the contact connected to terminal 108 and will deenergize the operating coil 91 of contactor 89 as follows: Terminal 108 is connected through conductor 115 to a point between one end of the operating coil 91 and resistor 102. It will therefore be evident that when terminals 107 and 108 are connected together the operating coil 91 will be short-circuited and the control circuit connected across resistor 102 through the following circuit: From one side of the secondary 96 of transformer 94 through fuse 97, conductor 98, through switch 93 to conductor 114, through one of the contacts of switch 89 to conductor 100, thence through switch 93 to conductor 113, terminal 107 to terminal 108, conductor 115, to one side of resistor 102, from the other side of resistor 102, through conductor 103, fuse 104 and back to the other side of secondary 96 of transformer 94. Under these conditions, contactor 89 will open its contacts and consequently deenergize operating coil 86 of the main contactor 79, which will then open its contacts and deenergize transformer 68. The heating coil being disconnected from the supply circuit, the temperature of the joint will begin to decrease until it reaches a low limit depending upon the setting of the potentiometer, whereupon the heating coil will again be connected. Thus by alternately controlling the energization of the heating coil through the potentiometer, the temperature of the joint may be closely maintained within predetermined limits for any desired time interval.

The motor which is connected to terminals 105 and 106 of the potentiometer will be energized so long as the blades of switch 93 are in their upper positions, through the following circuit: From the control transformer 94 one side of the secondary 96 thereof to fuse 97, conductor 98, through the central blade of switch 93 to conductor 112, from terminal 109 through a jumper 116 to terminal 105, thence through the motor to terminal 106, conductor 117, conductor 103, fuse 104, and thence to the other side of secondary 96 of transformer 94.

In order that it may be known at all times just how much current is passing through the heating coil, a current transformer 118 is connected in the secondary circuit of the main transformer 68. The current transformer 118 has its terminals connected through conductors 119 and 120 to an ammeter 121 which will register the current being fed to the heating coil.

The joint being treated may then be gradually cooled by adjusting the taps of the transformer so as to gradually decrease the amount of current being supplied to the heating coil.

The coil for inductively heating the joint will, when energized, heat the joint in such a manner that there will be no abrupt changes in temperature from the weld to the adjacent portions of the welded structure. The temperature will gradually decrease outwardly from the weld due to the gradual decrease in the density of the magnetic flux causing the heating.

The lines of magnetic flux set up in the joint by the heating coil will be most highly concentrated at the mid-portion of the coil, which is directly over the weld, and will gradually decrease as the ends of the coil are approached. Beyond the ends of the coil the flux density continues to gradually decrease until a point is reached where there is no magnetic flux to set up eddy currents and cause heating. It will therefore be evident that the temperature will be gradually decreased from the weld outwardly and there will be no abrupt changes which might set up additional stresses in the joint.

From the foregoing description, it will be apparent that the herein described invention provides novel apparatus and method for relieving stresses in welded joints such as pipe joints; which embodies novel means for uniformly heating the pipe joint by induction; which utilizes novel control whereby the joint may be heated to a predetermined temperature, maintained at that temperature for a predetermined period of time and thereafter gradually cooled so that the stresses may relieve themselves by plastic flow or creep, and change the martensitic and troostitic spots to sorbite to increase the ductility and toughness of the joint; and in which the various parts of the apparatus are so arranged as to enable the pipe joint to be conveniently and uniformly heated, and the heating to be so controlled as to assure that the stresses will be relieved.

Now, it is, of course, to be understood that although we have described in detail the preferred embodiment of our invention, the invention is not to be thus limited, but only insofar as defined by the scope and spirit of the appended claim.

We claim as our invention:

A multi-turn coil having each turn formed of a pair of arcuate sections of flat conducting material laid sidewise and pivotally connected to each other at one end and connected by a common pivot to other turns of said coil, the free ends of one group of sections forming the coil being each apertured to receive a rod, a rod entered through the apertures and connected with means maintaining the said free ends in spaced rigidly assembled and insulated relation to each other and to the rod, the free ends of another group of sections being each provided with a slot, and being held assembled in spaced and insulated relation to define a plurality of switch blades movable into sliding contact with desired free ends of said one group and into guided engagement with said rod.

ALFRED P. FUGILL.
DONALD H. COREY.